| United States Patent [19] | | [11] | 4,218,251 |
|---|---|---|---|
| Sanders | | [45] | Aug. 19, 1980 |

[54] DRIOGRAPHIC INK

[75] Inventor: James F. Sanders, Hudson, Wis.

[73] Assignee: Minnesota Mining and Manufacturing Company, Saint Paul, Minn.

[21] Appl. No.: 936,376

[22] Filed: Aug. 24, 1978

[51] Int. Cl.$^2$ .................... C09D 11/02; C09D 11/06; C09D 11/08; C09D 11/10

[52] U.S. Cl. ........................................ 106/30; 106/20; 106/22; 106/28; 106/29; 260/18 R; 260/23 R; 260/23.7 R; 260/23.7 H; 260/27 BB; 260/29.1 SB; 260/31.8 DR; 260/33.6 R; 260/33.6 A; 260/33.6 UA

[58] Field of Search .................. 106/20, 22, 23, 29, 106/30; 260/42.19, 42.21, 29.1 SB, 23.7 H, 33.6 R, 31.8 DR

[56] References Cited

U.S. PATENT DOCUMENTS

| 2,227,102 | 12/1940 | Olsen | 260/736 |
|---|---|---|---|
| 2,762,712 | 9/1956 | Bloch et al. | 106/28 |
| 2,866,712 | 12/1958 | Hart | 106/22 |
| 2,892,730 | 6/1959 | Kloepfer et al. | 106/193 |
| 3,023,181 | 2/1962 | Grotenhuis | 260/29.2 |
| 3,234,873 | 2/1966 | Miller | 101/149.2 |
| 3,406,137 | 10/1968 | Terry et al. | 260/28.5 |
| 3,666,502 | 5/1972 | Erikson | 106/22 |
| 3,803,070 | 4/1974 | Spencer et al. | 260/29.6 S |

FOREIGN PATENT DOCUMENTS 1142472 2/1969 United Kingdom ...................... 106/20

*Primary Examiner*—Carman J. Seccuro
*Attorney, Agent, or Firm*—Cruzan Alexander; Donald M. Sell; Gerald F. Chernivec

[57] ABSTRACT

A printing ink formulation capable of being utilized in driography comprising (a) a varnish comprising at least one polymer having a weight average molecular weight of at least about 25,000 and a solvent therefor, and (b) at least about 5.0 percent by weight, based on the varnish, of at least one non-reinforcing filler. Preferably, the ink also contains a minor amount of a low surface tension fluid which is incompatible with the varnish.

6 Claims, 1 Drawing Figure

DRIOGRAPHIC INK

BACKGROUND OF THE INVENTION

This invention relates to a driographic ink which is suitable for use in driography, or waterless planographic printing.

Lithography is the best known form of planographic printing, i.e., wherein both image and background areas lie substantially in the same plane. As such, lithography has been the only known practical and successful process of planographic printing heretofore known. Lithography works on the basic theory that water and oil are immisible, and the background or non-image areas of a lithographic printing plate are rendered water-receptive, i.e., hydrophilic, and when water-wet they thus repel conventional oily lithographic ink. The image areas, conversely, are ink-receptive, i.e., organophilic, and water-repellent. In operation, the plate is typically first dampened with a fountain solution, which wets the background or non-image areas, after which the oleo ink is rolled over the plate to coat the image areas, but is repelled from the dampened background areas.

While lithography has enjoyed tremendous commercial success, it has not been without attendant problems. One of the major problems with lithography is the basic fountain solution/ink combination. The necessity of the fountain solution can cause emulsification of the oily ink, and the fountain solution, because of its contact with the offset cylinder, can cause moistening of the copy sheets, thereby changing the dimensions thereof. Such can create special difficulties in the area of color printing, wherein each copy sheet must of necessity undergo multiple passes through the press.

The biggest problem is the control of the delicate balance necessary between ink and fountain solution so as to produce high quality image fidelity and uniformity. Such a delicate balance is difficult to maintain, and must be constantly monitored, especially as conditions change on the press during the course of the printing run.

In order to overcome the inherent problems relating to lithography, several dry planographic printing masters have appeared in the patent literature, which are intended to circumvent the aforementioned problems. A driographic printing plate, which removes the necessity for utilization of a dampening system, contains background or non-image areas which are inherently ink-repellent. Therefore, in theory, only the imaged portions of the driographic plate will accept ink. One such printing plate is disclosed and claimed in U.S. Pat. No. 3,511,178.

In essence, driography is based on the adhesion properties of the driographic plate. The plate typically has a background surface having a sufficiently low adhesion to printing ink that, without pre-wetting the plate with a dampening solution, the ink that is applied thereto in such areas will not split away and transfer from the inking rollers to the plate. In other words, the adhesion of the ink to the rollers and the cohesive forces between the ink particles are both greater than the adhesion between the ink and the plate surface.

In practice, however, driographic masters have been found to exhibit a different set of problems on the printing press, such problems having been found to be essentially as difficult to control as the aforementioned problems with lithography. Basically, the problems relating to driography are ink related. Because the background composition of the plates is inherently ink-repellent, the inks utilized with such plates must be carefully compounded so as to not deposit in the background areas, while at the same time, the same ink must readily deposit from the rollers to the printing or image areas of the master.

When conventional lithographic type inks are compounded for utilization with driographic masters, it has been ascertained that the cohesive properties of the ink must be increased to prevent ink deposition in the background areas. However, the cohesive nature of the ink must be carefully balanced so as to allow for deposition of ink on the image areas of the master as well. This careful balance of ink cohesive and adhesive properties can be easily disrupted by ambient temperature conditions, heating of the ink due to viscous flow and ink film splitting in the ink train, and by the breaking down of the ink filler structure due to mechanical working. The increase of ink temperature via viscous flow and ink film splitting is particularly troublesome because of the greater cohesive nature of the ink, which allows for greater energy dissipation in the ink train.

At reduced ink temperatures, the driographic master will not be properly coated or inked in the image areas. Because the ink is of a tacky nature, it may also pick fibers from the copy sheet during the offset process. Such may result in incomplete transfer of information to the copy sheet. Conversely, at elevated temperatures the ink will deposit in both the image and background areas of the master. The resultant information on the copy sheet is thereby rendered difficult to read because of the overall deposition of ink.

It has been generally found that when using conventional lithographic inks with driographic masters, ink film temperatures must be controlled within a temperature range of from about 10° F. to about 30° F. in order to satisfy printing requirements. This range can, of course, be easily exceeded by variations in ambient temperatures in the press room. For example, ink film temperatures may often vary by over 50° F. from a cold start of the press in the morning at 55° F. to approximately 110° F. after several hours of press operation.

Conventional printing inks are typically mixtures of varnishes, pigments, oils, solvents, driers, and other minor components. Inks utilized in offset printing are typically compounded to be highly viscous, i.e., from about 50 to about 500 poise at 90° F., have a high yield value and are termed "short". By the term "short" is meant that when an ink film is split, the film will break without forming long threads or strands. Such long threads or strands are considered undesirable because same have been found to cause misting or cobwebbing on the copy sheet. By cobwebbing is meant that poor edge sharpness of a print is observed on the copy sheet, which is a result of the fine fibers of ink extending from the ink images on the copy sheet. Therefore, viscosity and shortness have been thought to be important rheological properties for the preparation and compounding of inks, as is taught by J. H. Taylor and A. C. Zettlemoyer, TAPPI, Volume 41, No. 12 (1958) at page 749.

These rheological properties are typically controlled to a considerable degree by the varnish component contained in the ink. Varnishes are solutions or dispersions of polymers in hydrocarbon or other solvent, or in a drying oil such as linseed oil. The polymer/solvent combinations are typically chosen so that the ink is short and also contains a high weight percent of polymer. Low molecular weight polymers are utilized since it is desired to keep the varnish viscosities low and the polymer concentrations high in order to obtain proper ink splitting properties in the ink train, as well as a durable gloss image on paper. Such inks, when utilized in driography, have been unable to solve the aforementioned problems relative to the heat dissipation within the ink, causing same to increase in temperature beyond their acceptable printing ranges.

One driographic ink, disclosed in Belgian Publication 842,646, is designed to provide for a high viscosity and also to not become pseudoplastic in its behavior at elevated press temperatures, generally from about 85° F. to about 125° F. and preferably even higher. The elevated viscosity of this ink is taught to be achieved by incorporating therein high concentrations of conventional ink resins to thereby reduce the response of the ink viscosity to increased temperature. Although such an approach is helpful in stabilization of ink viscosity, it can also be self-defeating because the high ink viscosity at elevated temperatures generates greater heat during press operation.

Surprisingly it has now been found that by compounding a driographic ink utilizing the elasticity thereof as opposed to the viscosity as the controlling rheological property, together with the utilization of hereinafter defined fillers, there can be provided an ink having temendous temperature latitude. Additionally, by incorporation therein of a weak boundary layer fluid, the temperature range within which a given ink can function can be shifted.

SUMMARY OF THE INVENTION

In accordance with the invention there is provided a printing ink capable for use in driography comprising (a) a varnish comprising at least one polymer having a weight average molecular weight of at least about 25,000 and a solvent therefor; and (b) at least about 5.0 percent by weight, based on the varnish, of at least one non-reinforcing filler.

Preferably, the ink also contains a minor amount of a low surface tension fluid which is incompatible with the varnish.

By utilizing these components in the ink formulation, tremendous temperature latitude is displayed by the ink, i.e., satisfactory copies can be made over a wide operating temperature range.

DETAILED DESCRIPTION OF THE INVENTION

Figure 1:
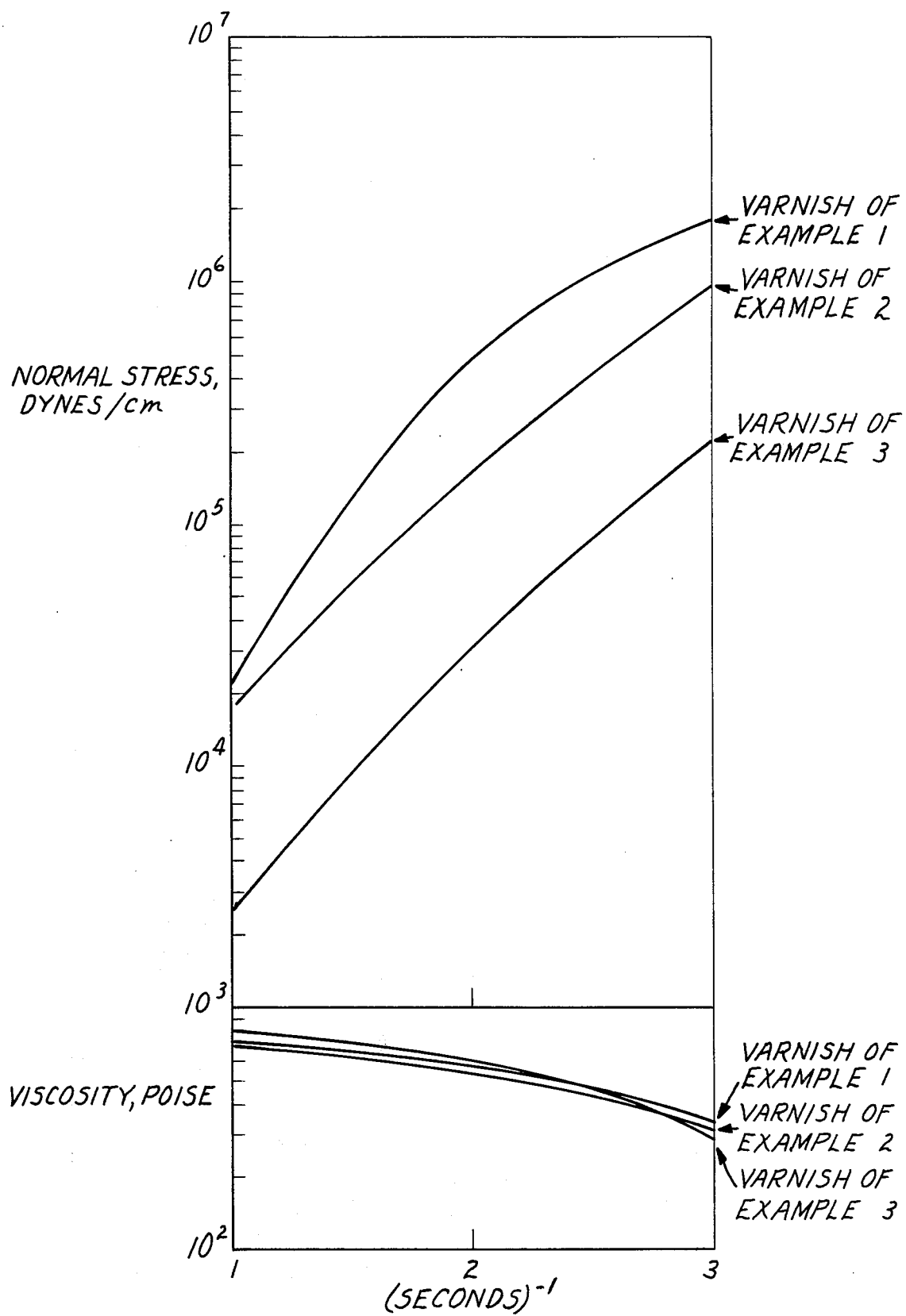

Surprisingly, in contradistinction to what has been believed, it has now been found that a driographic ink having proper press temperature latitude can be satisfactorily compounded if very high molecular weight polymers are utilized in the varnish component thereof. In essence, the polymers must have a sufficiently high molecular weight to participate in what is known as "entanglement coupling". This means, in essence, that the polymers react as though they are an elastic vulcanized or crosslinked rubber. Such "entanglement coupling" is necessary to form the transient network at the moment of ink splitting which can provide the cohesive nature to the ink which is apparently much less temperature dependent than the inelastic varnishes of conventional inks. For further discussion of such terminology, see J. D. Ferry's *Viscoelastic Properties of Polymers*, John Wiley & Sons, New York, New York (1970).

It has been ascertained that the practical limitation for high molecular weight polymers is that the polymer must have at least about a 25,000 weight average molecular weight. Exemplary polymers which are capable of functioning in my ink include chlorinated natural rubber, cyclisized natural rubber, polyacrylics and other vinyl addition polymers, and condensation polymers of sufficient molecular weight, or combinations thereof. When this polymer component is at the minimum weight average molecular weight of 25,000, the ink varnish must contain at least about 8 percent by weight of the polymer or mixture of polymers. For a polymer of greater than about 800,000 weight average molecular weight, as little as 4 percent has been determined to be sufficient to effectively expand the temperature latitude of the ink.

In addition to at least one high molecular weight polymer, the ink varnish may and usually will contain commonly used ink resins. Such resins are often selected to improve ink distribution in the press rollers, increase the ink tack properties, provide better ink color (via pigment wetting), increase the drying rate of the ink, or provide durability and gloss to the print on the copy sheet. Such resins may also be utilized to increase the viscosity of the ink to render same more easily handled or stored, because substantial amounts of gelling type fillers are not desirable in the ink of my invention. Exemplary resins include wood rosins, rosin esters, rosin maleics, alkyl resins, petroleum resins, polymerized drying oils, cellulose derivatives, and synthetic resins such as vinyl polymers, polyurethanes, polyamide resins, etc. Also, the resin might be a low molecular weight analog of the high molecular weight polymer contained in the varnish. Such resins must be compatible with the high molecular weight polymer and the solvent utilized in the varnish, which means that the polymer mixture must be stable, i.e., no precipitation or phase separation will occur.

When a varnish as described above is compounded, same is found to be very long and stringy. When conventional fillers, such as those normally utilized in inks, are added to such a varnish to make an ink, the resulting product is found to mist and cobweb badly on the printing press. For this reason, in conventional ink manufacture, such varnishes would probably be discarded. However, conventional ink practice would also suggest that the ink would work better if it were "shortened" with additional fillers such as carbon black, fumed silica, or gelling agents, e.g., aluminum stearate. Surprisingly, it has been ascertained that such approaches either have no appreciable effect on misting or cobwebbing, or are effective, but result in a corresponding unacceptable substantial decrease in the temperature latitude of the ink. As aforementioned, it has been determined that a very high extensibility or elongation of the ink is necessary in order to obtain proper temperature latitude, theoretically due to the geometrical considerations in the roller nip between the ink rollers and the plate cylinder of the printing press. Furthermore, in addition to reducing the temperature dependency of the cohesive properties of the ink, the highly elastic ink also allows for the fractured ink strand to rebound to the ink roller or master image.

It has been surprisingly found that the addition of substantial amounts of non-reinforcing, i.e., extending, filler will allow the ink to remain "long" or extensible and yet control the misting and cobwebbing problems. Such fillers are defined herein as those which have the effect of increasing the shear modulus of the ink in a manner such that the modulus is more dependent on the volume fraction of the filler in the ink than on the surface area of the filler. For discussions relative thereto, see the aforementioned J. D. Ferry's *Viscoelastic Properties of Polymers,* at page 455 to 458. Such filler materials are poorly wetted by the ink varnish and are preferably of substantial particle size. It is theorized that these fillers cause cavitation in the ink strands at the exit of the roller nip, thereby allowing the ink to fracture or split prior to excessive elongation, which would result in misting or cobwebbing.

Exemplary fillers useful herein include clays, talc, calcium carbonate, graphite, mica, molybdenum disulfide, sand and other silicas, aluminum oxides, titanium oxide, zinc oxide, other particulate oxides or salts, sugar, organic pigments, starches and polymer particles. The most effective, and thereby preferred fillers, are those which are large, i.e., from about 0.25 to about 20 microns, and are platy, acicular, or otherwise highly irregular in shape.

The filler concentration, as based on the ink varnish, must be at least 5 percent by weight, with the upper limit thereof being just below the point where "piling" can be observed on the printing press. "Piling" is the build-up of filler in the press which is left behind as the ink moves through the inking train.

In addition to the extending or non-reinforcing fillers, the ink may contain reinforcing fillers such as carbon black, fumed silica, etc., or gelling agents and similar additives for the purpose of pigmentation, improvement of ink distribution, drying or handling in concentrations below that which will adversely affect the temperature latitude of the ink. The tolerance of such fillers must be determined for each filler/varnish combination via trial and error, because these highly structural fillers exhibit varying effects depending on the polarity and degree of hydrogen bonding of the ink solvent.

In addition to the foregoing, it has been determined that low surface energy fluids which are incompatible with the ink varnish can be utilized to shift the temperature range in which an ink will print satisfactorily. For example, if a given ink is capable of printing quality copies between 60° F. and 75° F., by the addition of such a fluid to the ink, this range may be shifted to from 70° F. to 85° F. Although the printing range has not been expanded, and may often be somewhat slightly reduced, the utilization of such a fluid may be advantageous in, for example, a higher temperature range, wherein the ink may exhibit reduced tack properties, and therefore will have less tendency to pick paper fibers from a copy sheet.

It is believed that such low surface tension fluids function because they affect the boundary or interface between the driographic master and the ink. Because the effect would be similar relative to both the image and background areas of the driographic plate as far as lessening ink adhesion thereto, they do not improve the magnitude of the printing range, only the location of the range on the temperature scale.

The characteristics of such fluids are important. Both the surface tension and the viscosity thereof should be less than that of the ink itself. Furthermore, it is necessary that the fluid be incompatible with the ink varnish, i.e., the fluid must not appreciably dissolve in the varnish, but when mixed together must remain a separate phase.

The necessary concentration of the fluid in the ink required to shift the temperature range upwards by a desired amount will generally depend on the fluid, the ink varnish, and the fillers in the ink. Generally, the most important factors are the type of fluid and the solvent utilized in the ink varnish. For example, an ink containing an aliphatic hydrocarbon as the solvent may require only one-third to one-tenth the amount of a particular fluid to observe the same effect when the same fluid is used in a phthalate ester solvent-based ink. The concentration necessary to optimize a particular ink must of necessity be determined by trial and error. Excess fluid concentrations will cause a collapse of the printing range, perhaps to the point where acceptable copies cannot be made at any temperature.

Exemplary fluids, which have been found to have the greatest utility herein, are silicone fluids, due to their low surface tension and minimal solubility in most ink oils. Silicone fluids having a viscosity of from about 20 centipoise to about 1,000 centipoise have been found useful, with about 100 centipoise being preferred. At viscosities greater than about 350 centipoise, reduced effects on temperature shift are observed, and viscosities below about 20 centipoise exhibit excessively weak boundary layer effects and also may be too compatible with the ink varnish. Concentrations of silicone fluids, based on ink varnish, of from about 0.25 to about 5.0 percent by weight have been found to be effective.

Ink varnishes, which are in reality polymer solutions in a relatively nonvolatile solvent, are typically manufactured by a cooking procedure, wherein the solvent is first heated to near the melting point of the polymer, after which the polymer is slowly added and mixed therein until complete solvation of the polymer has occurred. Some polymers, such as chlorinated natural rubber, must be protected from extremely elevated temperatures due to a tendency to decompose. In the manufacture of a varnish containing several polymers of varying molecular weights, the high melting, less heat-sensitive polymers are added first, after which the temperature is lowered before the more heat-sensitive polymer is added. Once the prepared varnish has cooled,, pigments, fillers, diluents and low surface tension fluids can be added. The ink can then be mixed in a conventional mixer for a period of time, following which the ink is milled in a conventional three roll ink mill.

In compounding the finished formulation, such should print, at some temperature, as near to a sample print of acceptable quality as possible. To accomplish this, typical ink varnishes will be made by varying concentrations of polymer contained therein. Finished inks can then be manufactured by selecting a reasonable starting point for filler concentrations in the various varnishes. In this manner, by making numerous inks and comparing print quality obtained therefrom, the final ink formulation can be selected.

My invention will now be more specifically illustrated by the use of the following examples, wherein all parts are by weight unless otherwise specified. In order to test the temperature latitude of the inks of the examples, which is the criteria sought after, the inks in the examples were tested by varying the ambient room temperature. A special room was utilized wherein the temperature could be elevated by 10° F. in about 10 minutes. Accordingly, the inks were tested at room temperatures between 55° F. and 110° F. The press would be allowed to equilibrate for about 2 hours at a particular temperature prior to the test, whereupon the press would be operated for 100 copies at each temperature to prevent substantial heating of the ink rollers. The press utilized was a Ricoh Model 1510, commercially available from Ricoh Corp., from which all of the water rollers were removed, and which was operated at a press speed of 7200 impressions per hour.

Such test conditions were utilized because I have ascertained that if an ink prints satisfactorily over the above temperature range of from 55° F. to 110° F., it will perform satisfactorily from a cold start approximating 55° F. to continuous duty at 95° F. room temperature.

By printing satisfactorily is meant that line copy can be printed having a reflective optical density of about 1.3 to 1.4 and, simultaneously, a sufficiently clean background will be maintained such that no toning or scumming is discernible at normal reading distance. In addition, there is no misting or cobwebbing on the copy and image resolution is equivalent to that of the plate itself.

The driographic master utilized in the testing is described in U.S. Pat. No. 4,074,009, and imaging thereof was undertaken electrophotographically by an IBM Copier II plain paper copier.

EXAMPLE 1

In a suitable vessel were placed 41.9 parts of Diundecyl Phthalate (a solvent commercially available from Monsanto Inc.), 2.9 part of Mineral Seal Oil, commercially available from the Amsco Division of the Union Oil Company of California, and 4.5 parts of Superb Linseed Oil, commercially available from the Archer Daniels Midland Company. These components were heated to a temperature of 450° F., following which 5.4 parts of Pentalyn K, tradename for a rosin ester commercially available from Hercules Inc., and 10.3 parts of Uni-Rez A-808, tradename for a rosin maleic commercially available from the Union Camp Chemical Co.

The solution was cooled to 220° F., after which 5.8 parts of Parlon S-5, tradename for a chlorinated natural rubber having a weight average molecular weight of 85,000, commercially available from the Hercules Powder Company, 4.3 parts of Parlon S-20, a similar polymer of 215,000 weight average molecular weight, and 1.5 parts of Parlon S-125, chlorinated natural rubber of 885,000 weight average molecular weight were added. Such polymers constituted 15 percent of the varnish component of the ink.

To the solution were added 7.2 parts of Emtal 549 Talc, a non-reinforcing filler available from Engelhard, Inc., 11.1 parts of Regal 300 Carbon Black from Cabot Corp., 2.6 parts of 5-65-A395 Phthalo Blue dye from the Hilton Davis Co., and 2.6 parts of Dow Corning 200 Fluid, a 100 c.p. viscosity silicone fluid available from Dow Corning Corp.

The ink was then mixed for 2 hours in a Hobart N-50 mixer and milled on a conventional three-roll ink mill.

Upon placement on the press, the ink was found to print in the temperature range of from 55° F. to 110° F. with satisfctory copy quality. Electrical heaters were utilized to raise the press temperature to about 125° F. and good copies were still obtained.

The viscosity of the varnish, i.e., the solvent and polymers, utilized in the ink of this example was measured by a Laray Viscometer at 90° F. and ascertained to be 225 poise. For purposes of comparison, the examples described below were prepared such that the varnish viscosities were also 225±10 poise.

EXAMPLE 2

In order to illustrate the effect of the high molecular weight polymers contained in the inks, only Parlon S-5 polymer was used in this example as the high molecular weight component. The diundecyl phthalate was reduced to 41.0 parts and 12.8 parts of the Parlon S-5 polymer were included, so as to provide equivalent varnish viscosities. The other components were maintained as described in Example 1.

The ink was found to print in the temperature range from 55° F. to 110° F. It was, however, obvious during the experiment that 110° F. was approaching the upper limit for this ink, because the onset of background toning was observed under 20 X magnification, though such was not yet obvious at normal reading distance.

EXAMPLE 3

Example 1 was repeated with the exception that no high molecular weight chlorinated rubber was contained therein. The solvent contained 35.4 parts diundecyl phthalate, 2.4 parts Mineral Seal Oil, and 4.1 parts Superb Linseed Oil. The viscosity of the varnish was rendered the same as that in Example 1 by increasing the concentration of the Pentalyn K and Uni-Rez A-808 resins to 12.2 parts and 22.9 parts, respectively. The balance of components were maintained at the concentration level of Example 1.

This ink was found to print properly at 65° F. and 75° F. At 55° F. poor inking of the driographic master was noted, because of poor ink transfer from the printing blanket to the paper. At 85° F. and above, toning, i.e., ink deposition in the background or non-image areas of the driographic master, was noted.

The ink varnishes of the foregoing three examples were measured on a mechanical spectrometer manufactured by Rheometrics, Inc. This machine was utilized in the cone and plate mode to obtain the viscosity and first normal stress as a function of shear rate over the range of 10 to 1,000 seconds$^{-1}$.

Viscosity is, of course, a measure of the energy dissipated as heat when the material is deformed. The first normal stress here is a measure of the instantaneous stored energy, i.e., elasticity, of a material when it is suddenly deformed. This would therefore closely approximate the deformation of the ink as it exits the roller nip between the inking roller and the plate cylinder of the printing press.

Polymers and polymer solutions usually exhibit substantial values of the first normal stress over certain ranges of shear rate because they can deform on a molecular level to store energy. In particular, high molecular weight polymers tend to have very high values of normal stress difference because they can entangle to form what can be considered a time dependent crosslinked structure, i.e., instantaneously they act as though they are an elastic vulcanized rubber. This is the "entanglement coupling" hereinbefore discussed. Of course, this "crosslinked" structure can relax at longer time durations through molecular adjustment, but at the moment of ink splitting such a "crosslinked" structure could be effective. A further discussion of entanglements and normal stress can be found in W. W. Graessley's article in the *Journal of Chem. Physics*, Vol. 47 (1967) at page 1942.

If my foregoing hypothesis that entanglements are providing these inks their structure (since, as aforementioned, elasticity of polymers is known to be less temperature dependent than viscosity thereof) is correct, then the inks of the foregoing three examples should illustrate decreasing magnitudes of the first normal stress over the shear rate range where inks are considered to be deformed in the printing press. Since the time required for ink to pass through the roller nip is about $10^{-2}$ to $10^{-3}$ seconds, the viscosity and first normal stress were measured over the shear rate range from 10 to 1,000 seconds $-1$.

FIG. 1 illustrates this data. Clearly, from the foregoing, it is apparent that the viscosities of the ink formulations of the foregoing examples are substantially equivalent. However, as is illustrated, the normal stress magnitudes rank the three inks in the same order as the actual press temperature latitude tests undertaken, with the ink of Example 1 illustrating the largest elastic response and greatest press latitude temperature. This data supports the hypothesis that it is the rheological effect of the high molecular weight polymers which result in the press temperature latitude necessary for functioning in driography.

EXAMPLE 4

The varnish and ink of Example 1 were duplicated with the exception that the diundecyl phthalate, the major solvent component, was replaced with another plasticizer, tricresyl phosphate. The viscosity of the varnish was ascertained to be about 275 poise, but was not diluted in this case.

This ink was found to print in the range from 55° F. to 110° F.; however, the viscosity appeared to be slightly higher than optimum for good transport through the press. It was judged that from a press operation standpoint, the viscosity of this ink was slightly higher than optimum for providing the best print quality.

EXAMPLE 5

In a suitable vessel, 43.1 parts of diundecyl phthalate, 1.6 parts of Mineral Seal Oil, and 1.4 parts of Superb Linseed Oil were placed, followed by heating to 300° F. At this time, 12.8 parts of Elvacite 2044, tradename for a high molecular weight n-butyl methacrylate polymer commercially available from E. I. DuPont Inc. were slowly added to the solvent. The contents of the vessel were stirred until all of the methacrylate polymer were in solution.

To the solution were then added 6.2 parts of Pentalyn K, 11.7 parts of Uni-Rez A-808, 7.2 parts of Emtal 549 Talc, 11.1 part of Regal 300R Carbon Black, 2.6 parts of 5- 65-A395 Phthalo Blue, and 2.6 parts of Dow Corning 200 Fluid.

When placed on the press, this ink was found to print satisfactorily in the range from 55° F. to 110° F.

EXAMPLE 6

In accordance with the foregoing process, 28.5 parts of tricresyl phosphate and 4.5 parts of Superb Linseed Oil were placed in a vessel. After heating the solvents to 220° F., 5.8 parts of Parlon S-5, 4.3 parts of Parlon S-20, and 1.5 parts of Parlon S-125 were placed in the vessel. To this mixture were added 32.0 parts of SR-503-A, tradename for an alkyl modified phenolic resin having 89 to 91 percent solids in a hyrocarbon solvent, commercially available from the Lawter-Stresen-Reuter Company. The fillers utilized were the same as those of Example 1, with the concentration levels remaining the same.

This ink was found to print in the range from 55° F. to 110° F., and further illustrates the cause-effect relationship between high molecular weight polymers and the printing temperature latitude and the relative unimportance of the solvents and resins utilized.

EXAMPLE 7

This ink contains the varnish of Example 1, which comprises 76.5 weight percent of the total ink formulation thereof. However, the Emtal 549 Talc was replaced with 7.2 parts of carbon black, to thereby provide a carbon black concentration in the total ink formulation of 18.3 weight percent. The remaining fillers were the same as Example 1.

The ink appeared to be quite rigid, and the printing range was found to be from 85° F. to 110° F. Also, somewhat surprisingly, cobwebbing was observed.

To further illustrate the cobwebbing tendency of this ink, the press was run continuously for 1 hour at a room temperature of 90° F. with the ink of this example and that of Example 1. It was found that not only did the ink of the present example mist and cobweb badly, but also background toning became apparent with this ink under these operating conditions, while the ink of Example 1 performed very satisfactorily.

This experiment demonstrates that not only is the temperature latitude greatly affected by the use of excessive amounts of reinforcing fillers, but also the objectionable features of misting and cobwebbing cannot be effectively reduced to satisfactory levels.

EXAMPLE 8

A formulation was prepared utilizing the varnish of Example 1. However, no talc was utilized, and the other fillers of Example 1 were added in the same ratio to the varnish as those of Example 1. The ink was found to mist and cobweb badly when operated on the press.

EXAMPLE 9

The same ink as Example 8 was prepared with the addition of fumed silica, a reinforcing filler, at a level of 4 weight percent of the total ink formulation, which had the effect of "shortening" the ink. The silica utilized was Cab-O-Sil M-5, commercially available from the Cabot Corporation.

The press results were similar to those obtained in Example 8, i.e., the additional reinforcing filler had the effect of decreasing the printing temperature latitude.

EXAMPLE 10

The ink was formulated as per Example 1, with the exception that the varnish thereof was gelled with aluminum stearate, a gelling agent which is one of a class of metal organic compounds conventionally utilized to gel varnishes in ink manufacturing. The varnish was prepared in the procedure of Example 1 with the exception that 3 percent by weight of aluminum stearate based on the varnish were added to the varnish which had been held at a temperature of 230° F. Press tests similar to those obtained in Example 9 were evident, with the exception that misting was more pronounced in this example.

EXAMPLE 11

In this example the formulation of Example 1 was duplicated with the exception that various fillers were utilized to replace the Emtal 549 Talc. The concentration of said fillers were utilized at the same level as the talc in Example 1, i.e., such that the filler was 7.2 weight percent of the ink formulation.

Comparative testing for misting and cobwebbing was undertaken by adjusting the printing press to produce copies with substantial amounts of ink on the printed copy. During the comparative testing, the print reflected optical density was maintained at 1.3 to 1.4 such that about the same thickness of ink was present on the inking rollers for all of the examples. This was undertaken because cobwebbing and misting are known to be a function of ink thickness, and copies with a reflected optical density of about 1.3 to 1.4 are generally accepted as being dark enough to be considered acceptable quality.

The fillers are listed below, with a description as to their average particle size and shape as reported by technical literature of the supplier, if such was available. These fillers were found to decrease cobwebbing and misting to a level where good copies with clear backgrounds, good edge sharpness and reflected optical densities of from 1.3 to 1.4 could be obtained.

The fillers also did not reduce the temperature latitude of the ink by rendering same excessively short, or increasing the modulus substantially. They are listed in the approximate order of effectiveness as best could be visually observed by the press operator. Obviously, changes in the weight percentages of individual fillers would be expected to optimize each such filler; however, it has been determined that if a filler is not effective at about the 7.2 weight percent level it will not function at higher concentrations without attendant decrease in present temperature latitude.

Molybdenum Disulfide: 0.7 microns Alpha-Molykote Corp.
Emtal 549 Talc
Satintone #2 Clay: 2.0 microns A platy aluminum silicate Engelhard, M & C Division
Attasorb RVN Clay: 2.9 microns A needle-like clay Engelhard, M & C Division
Photox 80 Zinc Oxide: 0.27 microns New Jersey Zinc Company
Carbium MM Calcium Carbonate: 0.5 microns Diamond Shamrock Chem. Co.
XIOR Baryte (Barium Sulfate): 1.90 microns National Lead Co.
Crystal Powdered Sugar Crystal Sugar Company
VQC Copier Toner: about 10 microns 3M Company, Duplicating Products Division
Alkali Blue X35-LI-1201: a dry organic pigment Sherwin Williams Co.
Microthene FN 524: less than 20 microns A high melt index polyethylene powder U.S.I. Chemicals In contradistinction, fillers which are considered reinforcing, e.g., carbon black and fumed silica, when tested pursuant the foregoing example, were determined to not reduce cobwebbing and misting to a level where sharp prints with adequate reflected optical density could be obtained, or, they decreased the temperature latitude of the ink below that considered acceptable.

To ascertain approximate molecular weights and molecular weight distributions for the high molecular weight polymers utilized herein, a Waters Model 200 gel phase chromatograph was utilized, using tetrahydrofuran solvent at a temperature of 23° C. In such a measurement, what is actually measured is a molecular size of the polymer which is related to its molecular weight by the appropriate conversion factors. In practice, two molecular weights are generally of interest herein. The number average molecular weight and weight average molecular weight. The number average molecular weight constitutes the average of all the polymer links based on mole fraction. The weight average molecular weight constitutes the average molecular weight of the polymer system based on weight fraction of the molecules. The number average is always less than the weight average, and it is known from the literature that the weight average molecular weights are more important in the elastic responses of polymers than the number average molecular weights. The ratio of the weight average molecular weight and the number average molecular weight constitutes a measure of the breadth of the molecular weight distribution in a polymer. In my invention, it is desired to maintain a distribution as broad as possible, as can be illustrated by a comparison of the results of Example 1 with those of Example 2. By utilizing such a device, the blend of Parlon polymers of Example 1 has a number average molecular weight of 28,000, a weight average molecular weight of 250,000, and a ratio of weight average to number average of approximately 9.0. In Example 2, the number average molecular weight was 13,000 and the weight average was 85,000 with a ratio of 6.5.

In summary, it is apparent from the preceding examples that the polymer blends allow for utilization of extremely broad molecular weight distributions. The concentration of high molecular weight polymer in the ink can then be kept low. This allows an ink to be made wherein the viscous response of the ink contributed by the polymer remains low, thus preventing excessive heating. However, this same ink exhibits a high elastic response, due to the polymer, which substantially increases the temperature latitude as shown by the previous examples. Thus the viscosity can be easily adjusted to locate the printing temperature range on the temperature scale, while the elastic effect can be used to increase the magnitude of the printing temperature range. This ability to locate the temperature range in the desired region and then to broaden this range by use of broad molecular weight distributions of high molecular weight polymers is not possible with conventional ink compounding techniques. In my invention, however, it is necessary to use the non-reinforcing fillers, as previously described, to control ink splitting or more properly to control the fracture of the fluid. A further adjustment of the location of the printing range on the temperature scale is possible by use of the low viscosity, low surface energy, incompatible fluids. Combining the teachings of this invention, as summarized above, allows the ink formulator to make dry planographic inks with commercially acceptable temperature latitude and printing quality.

What is claimed is:

1. A printing ink capable for use in driography comprising: (a) a varnish comprising at least one polymer having a weight average molecular weight of at least about 25,000 and a solvent therefor; and (b) at least about 5.0 percent by weight, based on said varnish, of at least one non-reinforcing filler, said filler having an acicular or platy shape; (c) a silicone fluid incompatible with said varnish and having a viscosity of from about 20 centipoise to about 1,000 centipoise and a concentration of from about 0.25 to about 5.0 percent by weight of said varnish.

2. The printing ink of claim 1 wherein said polymer is selected from the group consisting of chlorinated natural rubber, cyclisized natural rubber, and vinyl-addition polymer.

3. The printing ink of claim 1 wherein said varnish further contains resin materials, said resin materials being compatible with said polymer.

4. The printing ink of claim 1 wherein said polymer is chlorinated natural rubber and comprises at least about 8 percent by weight of said varnish.

5. A printing ink capable for use in driography comprising: (a) a varnish comprising at least about 4 percent by weight of said varnish of a blend of chlorinated natural rubber polymers having weight average molecular weights of at least about 25,000, and an oxygen-containing solvent therefor; and (b) at least about 5.0 percent by weight based on said varnish, of at least one non-reinforcing filler, said filler having an acicular or platy shape; (c) a silicone fluid incompatible with said varnish and having a viscosity of from about 20 centipoise to about 1,000 centipoise and a concentration of from about 0.25 to about 5.0 percent by weight of said varnish.

6. The printing ink of claim 5 wherein said varnish further contains resin materials, said resin materials being compatable with said polymer.

* * * * *